(12) United States Patent
Jung et al.

(10) Patent No.: US 11,577,447 B2
(45) Date of Patent: Feb. 14, 2023

(54) POUCH FORMING APPARATUS AND METHOD

(71) Applicant: LG Chem, Ltd., Seoul (KR)

(72) Inventors: Tai Jin Jung, Daejeon (KR); Hang June Choi, Daejeon (KR); Kun Ha Park, Daejeon (KR); Cha Hun Ku, Daejeon (KR); Jung Kwan Pyo, Daejeon (KR)

(73) Assignee: LG Energy Solution, Ltd.

( * ) Notice: Subject to any disclaimer, the term of this patent is extended or adjusted under 35 U.S.C. 154(b) by 381 days.

(21) Appl. No.: 16/613,682

(22) PCT Filed: Dec. 6, 2018

(86) PCT No.: PCT/KR2018/015423
§ 371 (c)(1),
(2) Date: Nov. 14, 2019

(87) PCT Pub. No.: WO2019/151635
PCT Pub. Date: Aug. 8, 2019

(65) Prior Publication Data
US 2020/0406528 A1    Dec. 31, 2020

(30) Foreign Application Priority Data
Jan. 30, 2018  (KR) .................. 10-2018-0011293

(51) Int. Cl.
*B29C 51/20* (2006.01)
*B29C 35/08* (2006.01)
(Continued)

(52) U.S. Cl.
CPC .......... *B29C 51/20* (2013.01); *B29C 33/0022* (2013.01); *B29C 33/06* (2013.01);
(Continued)

(58) Field of Classification Search
CPC .... B29C 51/30; B29C 51/087; B29C 33/0022
See application file for complete search history.

(56) References Cited

U.S. PATENT DOCUMENTS 9,643,354 B2 *  5/2017  Yi ......................... H01M 50/20
10,173,362 B2 *  1/2019  Bartoli ................. B29C 51/087
(Continued)

FOREIGN PATENT DOCUMENTS

CN    101404327 A        4/2009
CN    102044714 A   *    5/2011
(Continued)

OTHER PUBLICATIONS

Search Report from Chinese Office Action for Application No. 2018800296721 dated Jan. 8, 2021; 3 pages.
(Continued)

*Primary Examiner* — Benjamin A Schiffman
(74) *Attorney, Agent, or Firm* — Lerner, David, Littenberg, Krumholz & Mentlik, LLP

(57) ABSTRACT

To solve the above problem, a pouch forming apparatus according to an embodiment of the present invention includes: a die in which a forming space is recessed inward from a top surface thereof; a partition wall partitioning the forming space into first and second forming spaces; a stripper disposed above the die and configured to descend to contact the die with the pouch film therebetween to fix the pouch film to be seated on a top surface of the die; and an electromagnetic force generation part disposed above the forming space and configured to generate electromagnetic force and configured to apply the electromagnetic force to the forming space.

13 Claims, 14 Drawing Sheets

(51) Int. Cl.
  *B29C 51/08* (2006.01)
  *H01M 50/116* (2021.01)
  *B29C 51/14* (2006.01)
  *B29C 51/26* (2006.01)
  *B32B 27/08* (2006.01)
  *B32B 27/32* (2006.01)
  *B32B 27/34* (2006.01)
  *B32B 27/36* (2006.01)
  *B29D 99/00* (2010.01)
  *B29C 70/88* (2006.01)
  *B29C 33/00* (2006.01)
  *B29C 33/06* (2006.01)
  *H01M 50/131* (2021.01)
  *B29K 23/00* (2006.01)
  *B29K 67/00* (2006.01)
  *B29K 77/00* (2006.01)
  *B29L 31/34* (2006.01)

(52) U.S. Cl.
  CPC .......... *B29C 35/0805* (2013.01); *B29C 51/08* (2013.01); *B29C 51/14* (2013.01); *B29C 51/265* (2013.01); *B29C 70/885* (2013.01); *B29D 99/006* (2013.01); *B32B 27/08* (2013.01); *B32B 27/32* (2013.01); *B32B 27/34* (2013.01); *B32B 27/36* (2013.01); *H01M 50/116* (2021.01); *B29K 2023/06* (2013.01); *B29K 2023/12* (2013.01); *B29K 2067/003* (2013.01); *B29K 2077/00* (2013.01); *B29L 2031/3468* (2013.01); *B29L 2031/3481* (2013.01); *B32B 2250/24* (2013.01); *B32B 2457/10* (2013.01); *H01M 50/131* (2021.01)

(56) References Cited

U.S. PATENT DOCUMENTS

| | | | |
|---|---|---|---|
| 2009/0092859 | A1 | 4/2009 | Kim |
| 2014/0054831 | A1* | 2/2014 | Emerson ................. B65B 47/10 425/500 |
| 2020/0282627 | A1* | 9/2020 | Kim ....................... B29C 51/262 |
| 2020/0331187 | A1* | 10/2020 | Suh ....................... B29C 51/266 |

FOREIGN PATENT DOCUMENTS

| | | | | |
|---|---|---|---|---|
| CN | 103658297 | B | | 1/2016 |
| CN | 107138591 | A | | 9/2017 |
| CN | 206834211 | U | * | 1/2018 |
| JP | 2002208383 | A | | 7/2002 |
| JP | 2004071301 | A | * | 3/2004 |
| JP | 4806848 | B2 | | 11/2011 |
| JP | 2013206678 | A | * | 10/2013 |
| KR | 20060011428 | A | | 2/2006 |
| KR | 20120063914 | A | | 6/2012 |
| KR | 20120074969 | A | | 7/2012 |
| KR | 20130132093 | A | | 12/2013 |
| KR | 20150089556 | A | | 8/2015 |
| KR | 101720215 | B1 | | 3/2017 |
| WO | 9830354 | A1 | | 7/1998 |

OTHER PUBLICATIONS

Extended European Search Report including the Written Opinion for Application No. EP 18903257.6 dated May 25, 2020, 9 pages.
Search report from International Application No. PCT/KR2018/015423, dated Mar. 15, 2019.

* cited by examiner

POUCH FORMING APPARATUS AND METHOD

CROSS-REFERENCE TO RELATED APPLICATION

The present application is a national phase entry under 35 U.S.C. § 371 of International Patent Application No. PCT/KR2018/015423, filed on Dec. 6, 2018, published in Korean, which claims priority from Korean Patent Application No. 10-2018-0011293, filed on Jan. 30, 2018, the disclosures of which are hereby incorporated by reference in their entireties.

TECHNICAL FIELD

The present invention relates to a pouch forming apparatus and method, and more particularly, to a pouch forming apparatus and method, in which a non-sealing part formed when a pouch film, in which two cup parts are formed, is bent is reduced in area.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

In general, a pouch that is a case of the pouch type secondary battery is manufactured by drawing a cup part in a pouch film made of a flexible material. Also, an electrode assembly and an electrolyte are accommodated in an accommodation space of the cup part, and then, the cup part is sealed to manufacture a secondary battery.

The pouch includes an upper pouch and a lower pouch. One side of the upper pouch and one side of the lower pouch may be connected to each other. Here, two cup parts may be formed in the upper pouch and the lower pouch, respectively. To manufacture the pouch, the two cup parts are drawn first on the pouch film at positions adjacent to each other, and then, the pouch film is bent so that the two cup parts face each other.

To improve energy efficiency in the secondary battery, an unnecessary volume has to be reduced on the whole. For this, the upper pouch and the lower pouch have to be connected to each other to reduce an area of a non-sealing part on which the sealing is not performed. Here, a width of the non-sealing part is proportional to a distance between the two cup parts. Thus, when the two cup parts are formed in the pouch film at the same time, the two cup parts have to be formed so that the distance therebetween is reduced.

FIG. 1 is a schematic view illustrating a state before a pouch film 435 is drawn by using a pouch forming apparatus 3 according to the related art.

According to the related art, a pouch film 435 is seated on a die, and a stripper 32 fixes the pouch film 435. Then, the pouch film 435 is stretched by using a punch 33 so as to perform drawing. Here, when the two cup parts 433 are formed, as illustrated in FIG. 1, a partition wall 312 partitioning a forming space of the die 31 into two spaces is provided. Thus, the distance between first and second cup parts 4331 and 4331 is determined by a thickness t1 of the partition wall 312. However, since physical force is applied to the pouch film 435 in the drawing method, the pouch film 435 may be ruptured at a portion thereof seated on the partition wall 312.

FIG. 2 is a schematic view illustrating a process of drawing the pouch film 435 by using the pouch forming apparatus 3 according to the related art, and FIG. 3 is a perspective view of a secondary battery 4 including the pouch formed by using the pouch forming apparatus 3.

To prevent the above problem from occurring, as illustrated in FIG. 2, the stripper 32 contacts a top surface of the partition wall 312 as well as a peripheral portion of the forming space with the pouch film 435 therebetween to fix the pouch film 435. However, a top surface of the partition wall 312 has to be secured over a predetermined area so that the stripper 32 contacts the top surface of the partition wall 312. Here, there has been a limit in reducing the thickness t1 of the partition wall 312 by at least 5 mm or more. That is, as illustrated in FIG. 3, there has been a limit in reducing a width D1 of the non-sealing part 4342 by 2.5 mm or more. Also, the top surface of the partition wall 312 has to be flat so that the stripper 32 contacts the partition wall 312. Thus, there is still possibility that the pouch film 435 is ruptured.

DISCLOSURE OF THE INVENTION

Technical Problem

An object to be solved by the present invention is to provide a pouch forming apparatus and method in which a non-sealing part formed when a pouch film, in which two cup parts are formed, is bent is reduced in area.

The objects of the present invention are not limited to the aforementioned object, but other objects not described herein will be clearly understood by those skilled in the art from descriptions below.

Technical Solution

To solve the above problem, a pouch forming apparatus according to an embodiment of the present invention includes: a die in which a forming space is recessed inward from a top surface thereof; a partition wall partitioning the forming space into first and second forming spaces; a stripper disposed above the die and configured to descend to contact the die with the pouch film therebetween to fix the pouch film to be seated on a top surface of the die; and an electromagnetic force generation part disposed above the forming space and configured to generate an electromagnetic force and configured to apply the electromagnetic force to the forming space.

The electromagnetic force generation part may be configured to be disposed above the first forming space.

The electromagnetic force generation part may be configured to apply the electromagnetic force to the first forming space and then be configured to move to a location above the second forming space.

The electromagnetic force generation part may be configured to be disposed above the second forming space.

The partition wall may have a thickness of 0.1 mm to 3 mm.

The stripper may be configured to contact only a peripheral portion of the die located outside of a periphery of the forming space with the pouch film therebetween to fix the pouch film to be seated on the top surface of the die.

An upwardly-protruding end of the partition wall may have a curved surface.

To solve the above problem, a pouch forming method according to an embodiment of the present invention includes: a seating step of seating a pouch film on a top surface of a die to cover an open end of a forming space that is recessed inward from the top surface of the die and that is partitioned into first and second spaces by a partition wall; a stripper descending step of allowing a stripper disposed above the die to descend from an upper location above and remote from the die to a lower location adjacent to the top surface of the die; a fixing step of contacting the stripper to the pouch film to seat the pouch film onto the top surface of the die; and a forming step of allowing an electromagnetic force generation part disposed above the forming space to generate electromagnetic force so as to apply the electromagnetic force to the forming space, so that a first cup part and a second cup part are respectively drawn in the pouch film along the first forming space and the second forming space, respectively.

During the generating of the electromagnetic force, the electromagnetic force generation part may be disposed above the first forming space.

The forming step may include: a step of allowing the electromagnetic force generation part to apply the electromagnetic force to the first forming space; a step of drawing the first cup part in the pouch film; a step of moving the electromagnetic force generation part to a location above the second forming space; a step of allowing the electromagnetic force generation part to apply the electromagnetic force to the second forming space; and a step of drawing the second cup part in the pouch film.

During the generating of the electromagnetic force, the electromagnetic force generation part may be disposed above the second forming space.

During the step of applying the electromagnetic force, the electromagnetic force generation part may apply the electromagnetic force to the first and second forming spaces at the same time.

The partition wall may have a thickness of 0.1 mm to 3 mm.

During the fixing step, during the contacting of the stripper to the pouch film, the stripper may contact only a peripheral portion of the die located outside of a periphery of the forming space with the pouch film therebetween to fix the pouch film to be seated on the top surface of the die.

Particularities of other embodiments are included in the detailed description and drawings.

Advantageous Effects

The embodiments of the present invention may have at least the following effects.

Since the non-sealing part is manufactured to have a width of 1 mm or less, the non-sealing part may be reduced in area to improve the energy efficiency.

When the stripper contacts the die with the pouch film therebetween to fix the pouch film, it may be sufficient to contact the peripheral portion of the forming space without contacting the partition wall.

The effects of the prevent invention are not limited by the aforementioned description, and thus, more varied effects are involved in this specification.

MODE FOR CARRYING OUT THE INVENTION

Figure 1:
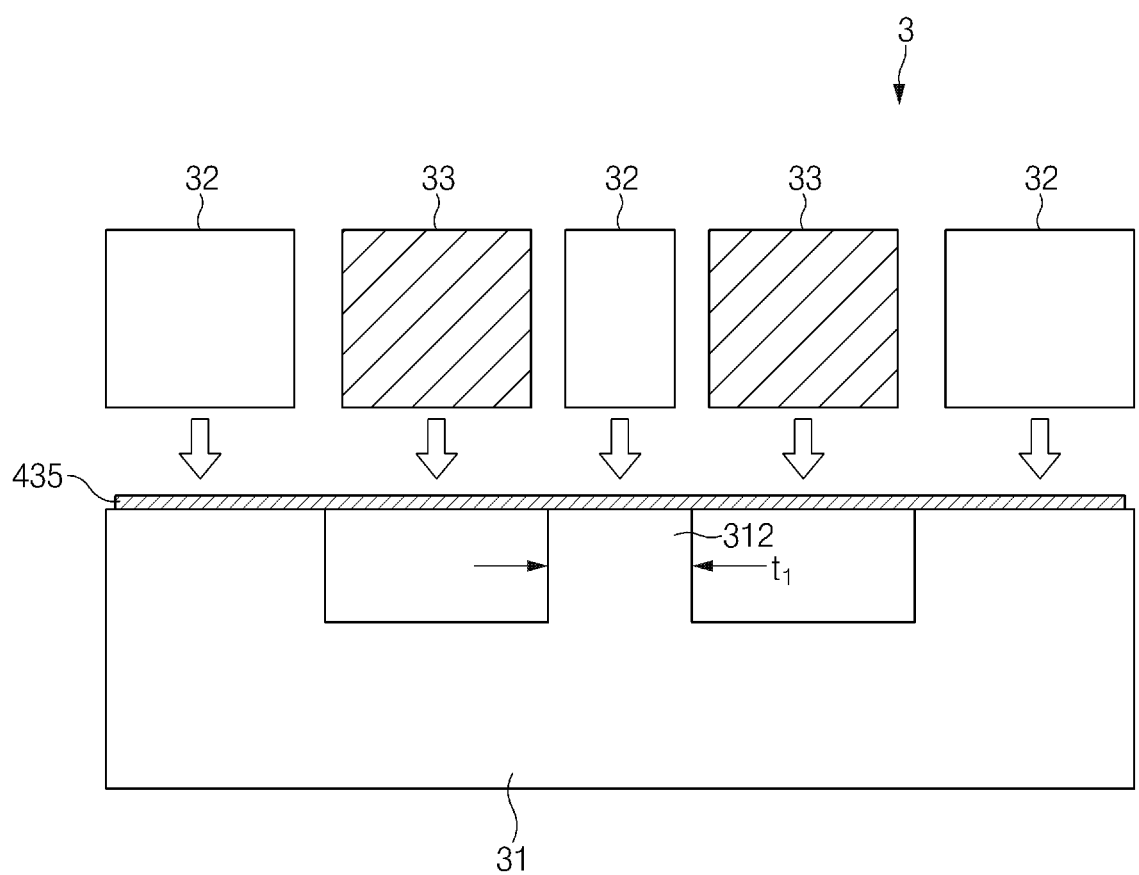
FIG. 1 is a schematic view illustrating a state before a pouch film is drawn by using a pouch forming apparatus according to a related art.
Figure 2:
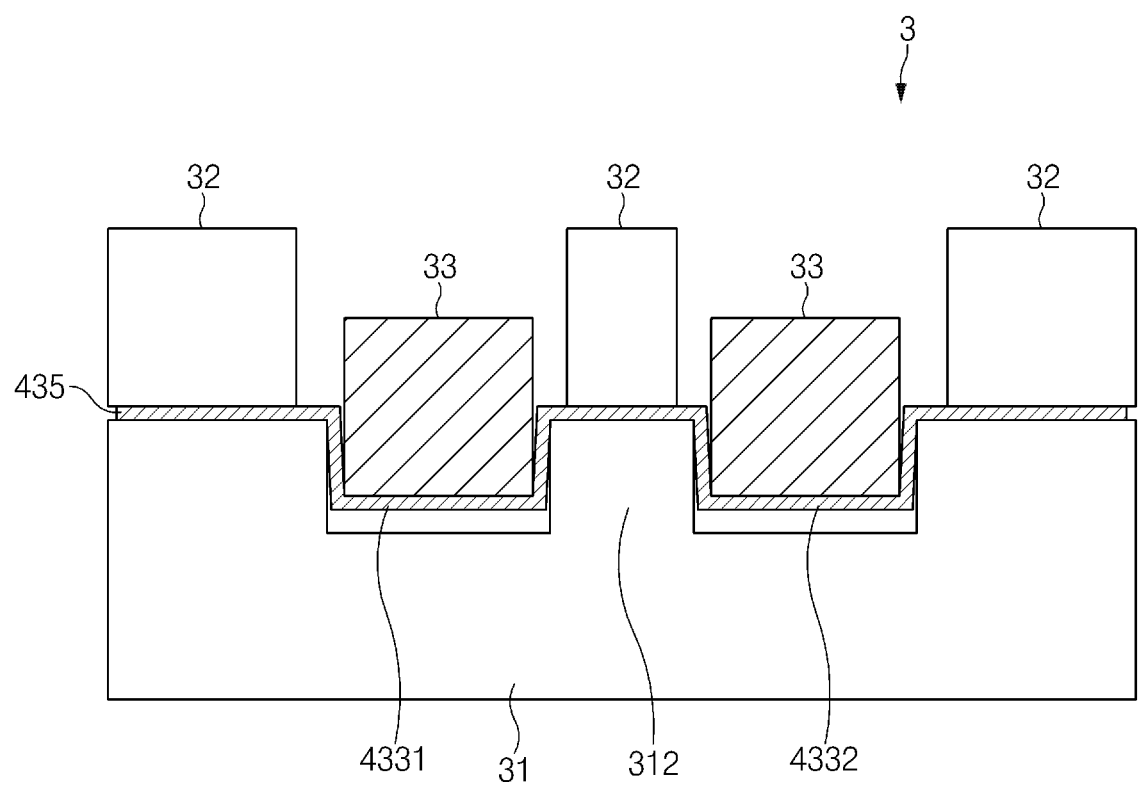
FIG. 2 is a schematic view illustrating a process of drawing the pouch film by using a pouch forming apparatus according to the related art.
Figure 3:
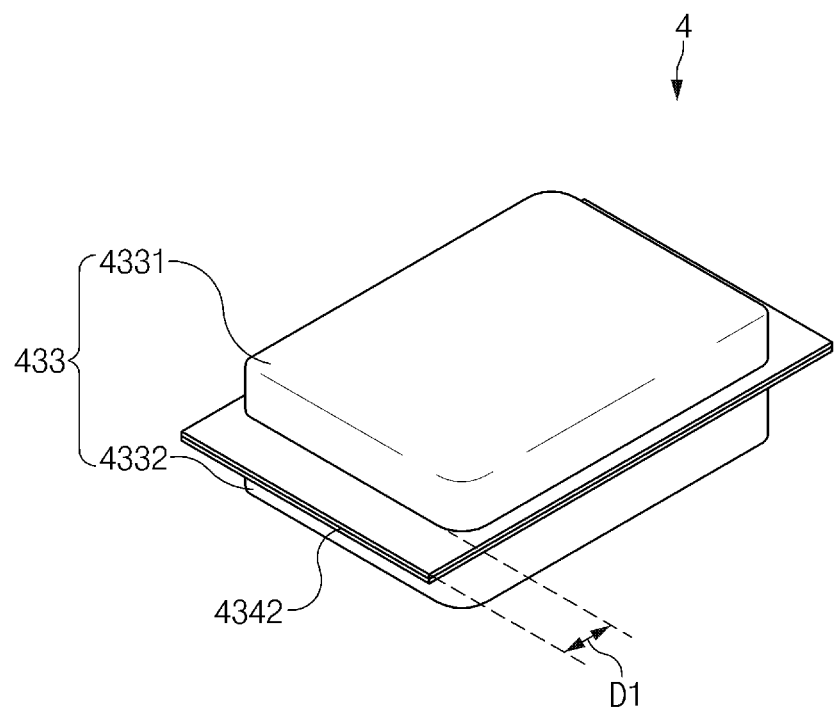
FIG. 3 is a perspective view of a secondary battery including the pouch formed by using the pouch forming apparatus.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of 'comprises' and/or 'comprising' does not exclude other components besides a mentioned component.

Hereinafter, preferred embodiments will be described in detail with reference to the accompanying drawings.

Figure 4:
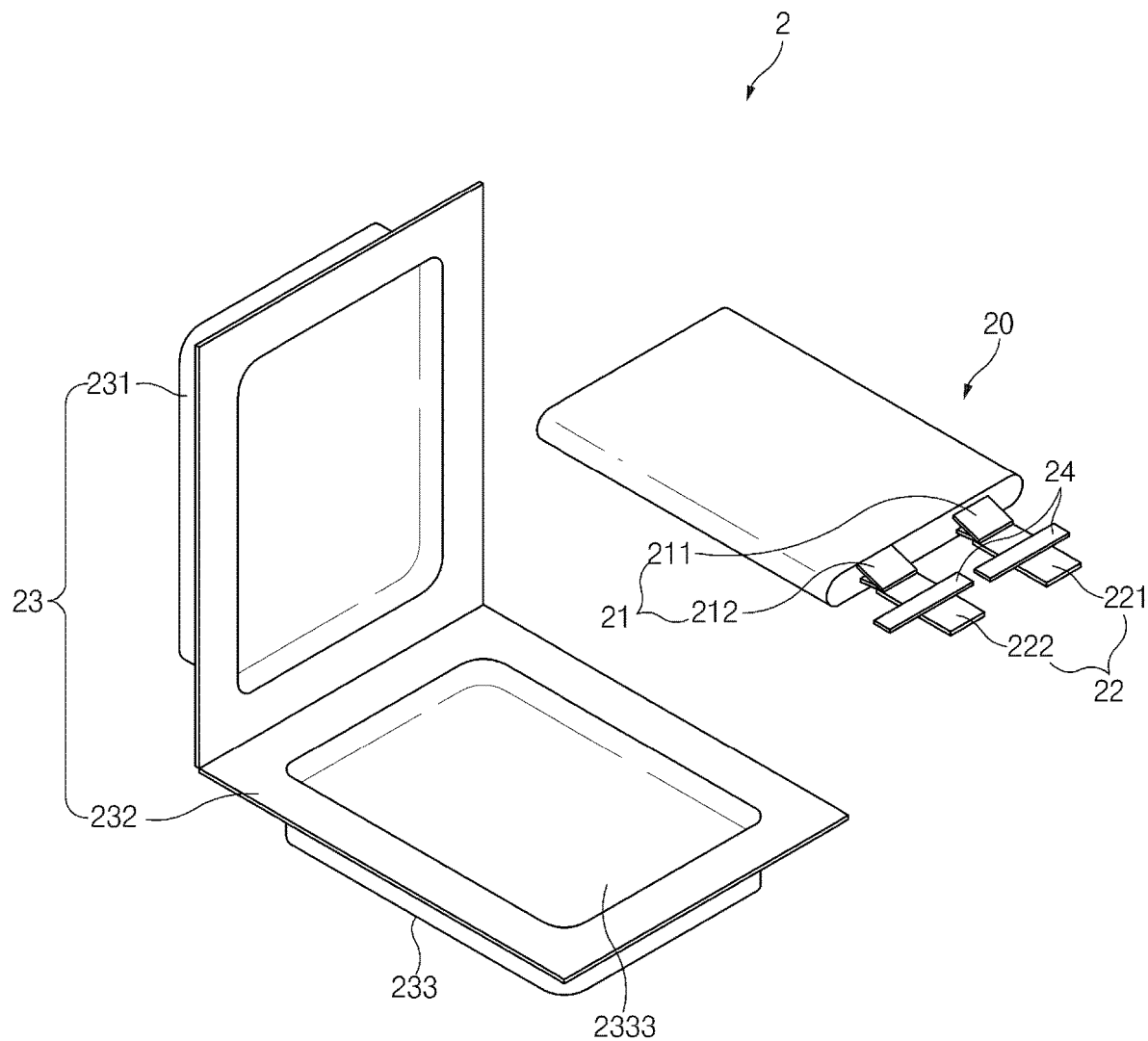
FIG. 4 is an assembled view of a pouch type secondary battery including a battery case that is formed by using a pouch forming apparatus according to an embodiment of the present invention.

FIG. 4 is an assembled view of a pouch type secondary battery 2 including a battery case 23 that is formed by using a pouch forming apparatus 1 according to an embodiment of the present invention.

In general, in order to manufacture the lithium secondary battery 2, first, slurry in which an electrode active material, a binder, and a plasticizer are mixed is applied to a positive electrode collector and a negative electrode collector to manufacture a positive electrode and a negative electrode. Then, a separator is laminated on both sides to form an electrode assembly 20. Also, the electrode assembly 20 is accommodated in the battery case 23, and an electrolyte is injected in the battery case 23. Then, the battery case 23 is sealed.

As illustrated in FIG. 4, the electrode assembly 20 includes an electrode tab 21. The electrode tab 21 is connected to each of a positive electrode and a negative electrode of the electrode assembly 20 to protrude to the outside of the electrode assembly 20, thereby providing a path, through which electrons are moved, between the inside and outside of the electrode assembly 20. The electrode collector of the electrode assembly 20 is constituted by a portion coated with the slurry and a distal end, on which the slurry is not applied, i.e., a non-coating portion. Also, the electrode tab 21 may be formed by cutting the non-coating portion or by connecting a separate conductive member to the non-coating portion through ultrasonic welding. As illustrated in FIG. 4, the electrode tabs 21 may protrude from one side of the electrode assembly 20 in the same direction, but the present invention is not limited thereto. For example, the electrode tabs may protrude in directions different from each other.

In the electrode assembly 20, the electrode lead 22 is connected to the electrode tab 21 through spot welding. Also, a portion of the electrode lead 22 is surrounded by an insulation part 24. The insulation part 24 may be disposed to be limited within a sealing part 2341 (see FIG. 11) at which an upper pouch 231 and a lower pouch 232 are thermally fused, so that the electrode lead 22 is bonded to the battery case 23. Also, electricity generated from the electrode assembly 20 may be prevented from flowing to the battery case 23 through the electrode lead 22, and the sealing of the battery case 23 may be maintained. Thus, the insulation part 24 may be made of a nonconductor having non-conductivity, which is not electrically conductive. In general, although an insulation tape which is easily attached to the electrode lead 22 and has a relatively thin thickness is mainly used as the insulation part 24, the present invention is not limited thereto. For example, various members may be used as the insulation part 14 as long as the members are capable of insulating the electrode lead 22.

The electrode lead 22 may extend in the same direction or extend in directions different from each other according to the formation positions of the positive electrode tab 211 and the negative electrode tab 212. The positive electrode lead 221 and the negative electrode lead 222 may be made of materials different from each other. That is, the positive electrode lead 221 may be made of the same material as the positive current collector, i.e., an aluminum (Al) material, and the negative electrode lead 222 may be made of the same material as the negative current collector, i.e., a copper (Cu) material or a copper material coated with nickel (Ni). Also, a portion of the electrode lead 22, which protrudes to the outside of the battery case 23, may be provided as a terminal part and electrically connected to an external terminal.

In the pouch type secondary battery 2 according to an embodiment of the present invention, the battery case 23 may be a pouch made of a flexible material. Hereinafter, the case in which the battery case 23 is the pouch will be described. Also, th battery case 23 accommodates the electrode assembly 20 so that a portion of the electrode lead 22, i.e., the terminal part is exposed and then is sealed. As illustrated in FIG. 4, the battery case 23 includes the upper pouch 231 and the lower pouch 232. A cup part 233 is formed in each of the upper pouch 231 and the lower pouch 232 to provide an accommodation space 2333 in which the electrode assembly 20 is accommodated. Here, the upper pouch 231 and the lower pouch 232 may be curved with respect to each other to prevent the electrode assembly 20 from being separated to the outside of the battery case 23. Here, as illustrated in FIG. 4, one side of the upper pouch 231 and one side of the lower pouch 232 are coupled to each other, but is not limited thereto. For example, the upper and lower pouches 231 and 232 may be variously manufactured, i.e., may be separately manufactured to be separated from each other.

When the electrode lead 22 is connected to the electrode tab 21 of the electrode assembly 20, and the insulation part 24 is formed on a portion of the electrode lead 22, the electrode assembly 20 is accommodated in the accommodation space 2333, and the upper pouch 231 and the lower pouch 232 are covered with respect to each other. Also, when the electrolyte is injected, and the sealing part 2341 (see FIG. 11) formed on an edge of each of the upper pouch 231 and the lower pouch 232 is sealed, the secondary battery 2 is manufactured.

Figure 5:
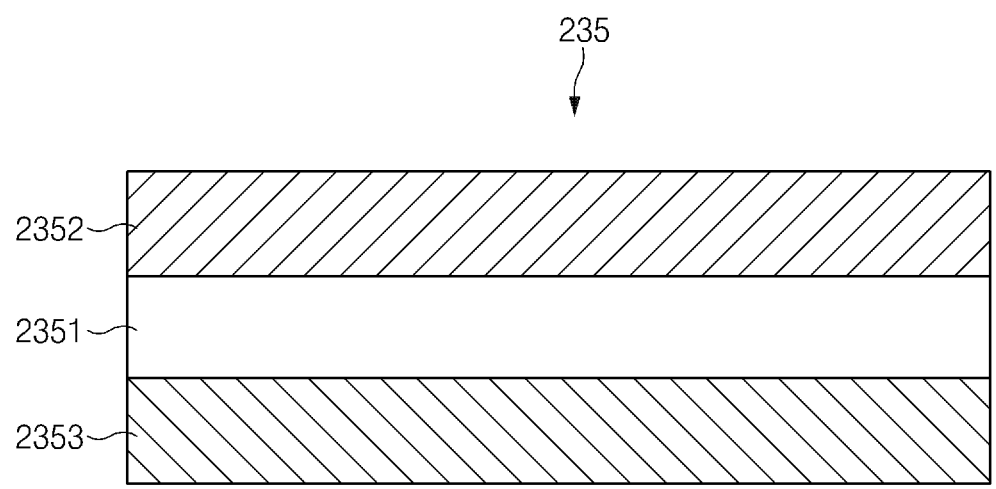
FIG. 5 is a cross-sectional view of a pouch film for the secondary battery, which is formed by using the pouch forming apparatus according to an embodiment of the present invention.

FIG. 5 is a cross-sectional view of the pouch film 235 for the secondary battery, which is formed by using the pouch forming apparatus 1 according to an embodiment of the present invention.

In general, the battery case 23 is manufactured by performing drawing on the pouch film 235. That is, the pouch film 235 is elongated to form the cup part 233, thereby manufacturing the battery case 23. The pouch film 235 includes a gas barrier layer 2351, a surface protection layer 2352, and a sealant layer 2353.

The gas barrier layer 2351 may secure mechanical strength of the battery case 23, block introduction and discharge of gas or moisture outside the secondary battery, and prevent an electrolyte from leaking. In general, the gas barrier layer 2351 includes a metal. Particularly, aluminum (Al) foil is mainly used for the gas barrier layer 2351. Aluminum may secure the mechanical strength of a predetermined level or more, but be light in weight. Thus, aluminum may secure complement and heat dissipation for electrochemical properties of the electrode assembly 20 and the electrolyte.

The surface protection layer 2352 is made of a polymer and disposed at the outermost layer to protect the secondary battery 2 against external friction and collision and also electrically insulates the electrode assembly 20 from the outside. Here, the outermost layer represents a direction opposite to a direction in which the electrode assembly 20 is disposed with respect to the gas barrier layer 2351, i.e., in an outward direction. A polymer such as a nylon resin or polyethylene terephthalate (PET) having mainly abrasion resistance and heat resistance is used for the surface protection layer 2352. Also, the surface protection layer 2352 may have a single layer structure made of one material or a composite layer structure in which two or more materials are respectively formed as layers.

The sealant layer 2353 is made of a polymer and disposed at the innermost layer to directly contact the electrode assembly 20. The pouch type battery case 23 may be manufactured while a portion thereof is stretched to form the cup part 233 having the accommodation space 2333 having a bag shape when the pouch film 235 having the lamination structure as described above is drawn by using a punch or the like. Also, when the electrode assembly 20 is accommodated in the accommodation space 2333, the electrolyte is injected. Thereafter, when the upper pouch 231 and the lower pouch 232 may contact each other, and thermal compression is performed on the sealing part 2341 (see FIG. 11), the sealant layers 2353 may be bonded to each other to seal the battery case 23. Here, since the sealant layer 2353 directly contacts the electrode assembly 20, the sealant layer 2353 may have to have insulating properties. Also, since the sealant layer 2353 contacts the electrolyte, the sealant layer 2353 may have to have corrosion resistance. Also, since the inside of the battery case 23 is completely sealed to prevent materials from moving between the inside and outside of the battery case 23, high sealability has to be realized. That is, the sealing part 2341 in which the sealant layers 2353 are bonded to each other should have superior bonding strength. In general, a polyolefin-based resin such as polypropylene (PP) or polyethylene (PE) may be mainly used for the sealant layer 2353. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 2353. Furthermore, the sealant layer 23 may be made of a cated polypropylene or a polypropylene-butylene-ethylene terpolymer. Also, the sealant layer 2353 may have a single layer structure made of one material or a composite layer structure in which two or more materials are respectively formed as layers.

Figure 6:
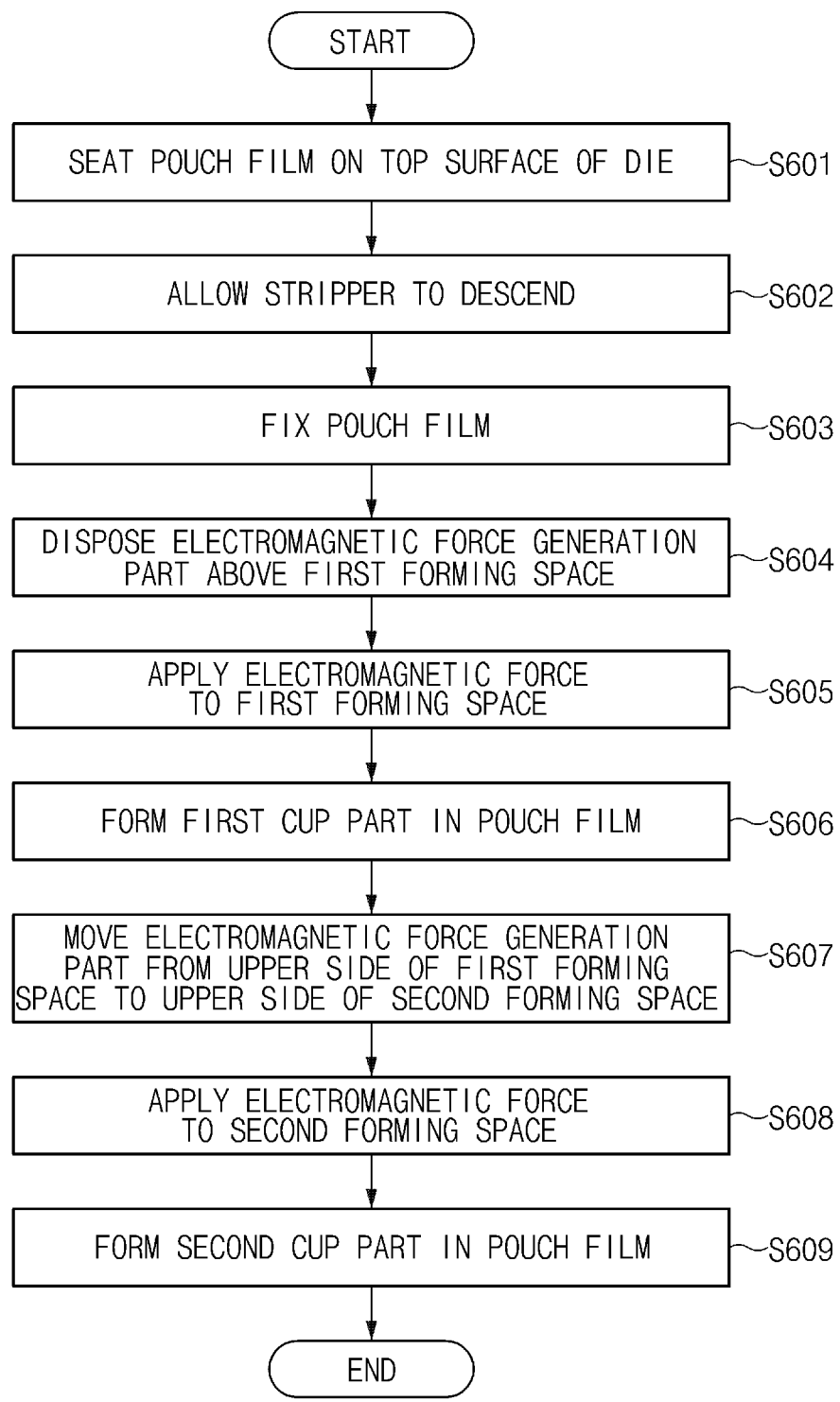
FIG. 6 is a flowchart illustrating a pouch forming method according to an embodiment of the present invention.

FIG. 6 is a flowchart illustrating a pouch forming method according to an embodiment of the present invention.

A pouch forming method according to embodiments of the present invention includes seating steps (S601 and S1201) of seating a pouch film 235 on a top surface of a die 11 to cover an opening end of a forming space 111 that is recessed inward from the top surface of the die 11 and partitioned into a plurality of spaces by a partition wall 112, stripper descending steps (S602 and S1202) of allowing a stripper 12 disposed above the die 11 to descend, fixing steps (S603 and S1203) of allowing the stripper 12 to fix the pouch film 235, and forming steps (S604 to S609 and S1204 to S1206) of allowing an electromagnetic force generation part 13 disposed above the forming space 111 to generate electromagnetic force so as to apply the electromagnetic force to the forming space 111 so that a first cup part 2331 and a second cup part 2332 are respectively drawn in the pouch film 235 along a first forming space 1111 and a second forming space 1112. Here, the partition wall 112 has a thickness t2 of 0.1 mm to 3 mm, preferably, 1 mm to 2 mm.

Thus, according to the present invention, instead of that the pouch film 235 is physically formed by using a punch, the electromagnetic force is applied to form the pouch film 235, and the partition wall 112 between the two cup parts 233 has a very thin thickness, particularly, a thickness of 2 mm or less. Thus, since the non-sealing part 2342 is manufactured to be reduced to a width D2 of 1 mm or less, the non-sealing part 2342 may be reduced in area to improve energy efficiency.

Particularly, in the pouch forming method according to an embodiment of the present invention, the forming step includes a step of allowing the electromagnetic force generation part 13 to apply the electromagnetic force to the first forming space 1111 in a state in which the electromagnetic force generation part 13 is disposed first above the first forming space 1111, a step of drawing the first cup pat 2331 in the pouch film 235, a step of moving the electromagnetic force generation part 13 to an upper side of the second forming space 1112, a step of allowing the electromagnetic force generation part 13 to apply the electromagnetic force to the second forming space 1112, and a step of drawing the second cup part 2332 in the pouch film 235.

Hereinafter, each of the steps illustrated in FIG. 6 will be described with reference to FIGS. 7 to 11.

Figure 7:
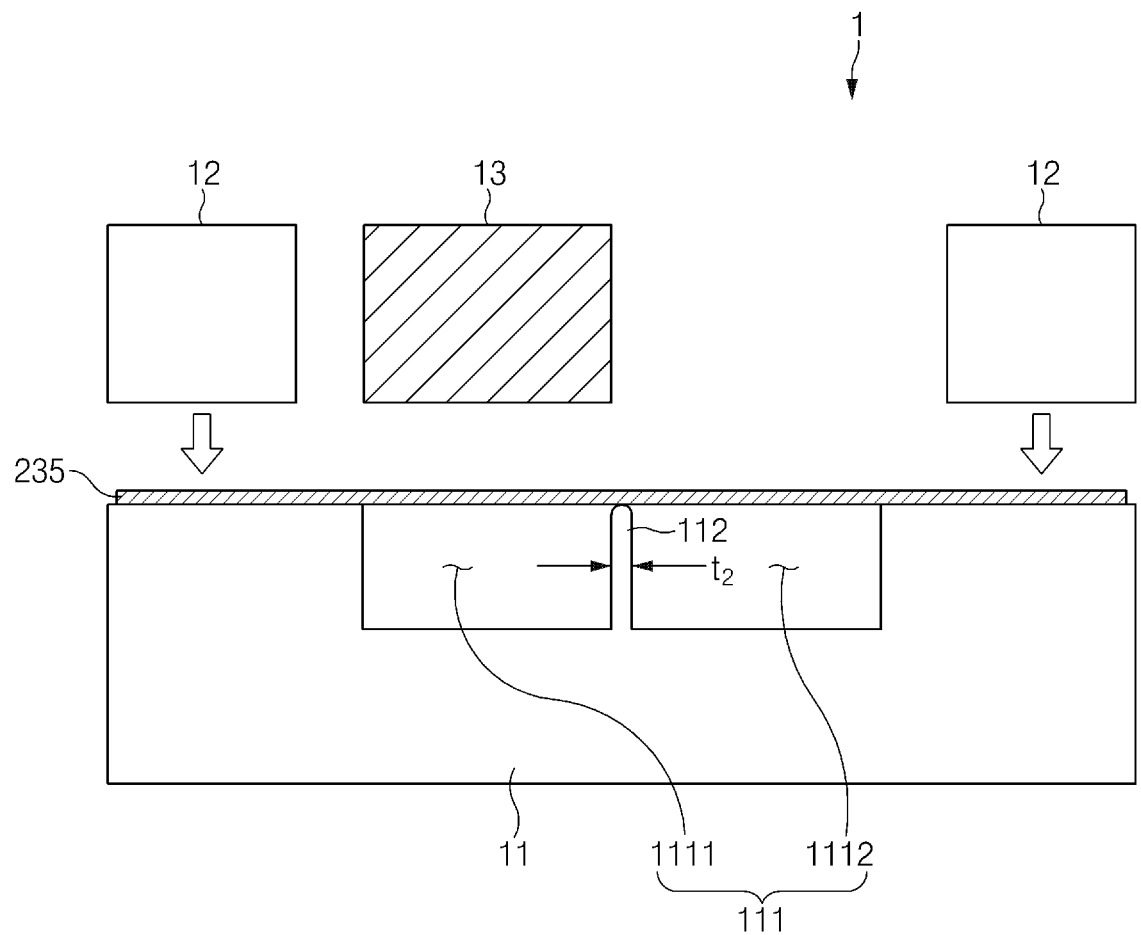
FIG. 7 is a schematic view illustrating a state in which the pouch film is seated on a top surface of a die of the pouch forming apparatus according to an embodiment of the present invention.

FIG. 7 is a schematic view illustrating a state in which the pouch film 235 is seated on the top surface of the die 11 of the pouch forming apparatus 1 according to an embodiment of the present invention.

The pouch forming apparatus 1 according to an embodiment of the present invention includes the die 11 in which the forming space 111 is formed to be recessed inward from the top surface, the partition wall 112 partitioning the forming space 111 into the first and second forming spaces 1111 and 1112, the stripper 12 disposed above the die 11 and descending to contact the die 11 with the pouch film 235 therebetween and thereby to fix the pouch film 235 when the pouch film 235 is seated on the top surface of the die 11, and the electromagnetic force generation part 13 disposed above the forming space 111 to generate the electromagnetic force so as to apply the electromagnetic force to the forming space 111.

The die 11 provides a place on which the pouch film 235 that is an object to be formed is seated. In order to draw the pouch film 235 later, the die 11 includes the forming space 111 that is formed to be recessed inward from the top surface. The pouch film 235 has to be stably seated on the top surface of the die 11. Thus, it is preferable that the remaining area of the die 11 except for the area in which the forming space 111 is formed is flat and parallel to the ground. However, the present invention is not limited thereto. For example, in order to easily fix the pouch film 235 later, various shapes such as a lattice pattern or fine unevenness may be formed on the top surface of the die 11. In order to form the cup part 233 in the pouch film 235, first, as illustrated in FIG. 7, the pouch film 235 is seated on the top surface of the die 11 (S601).

The forming space 111 may have a shape and size corresponding to an outer appearance of the cup part 233 that will be formed by forming the pouch film 235. Here, the correspondence to the shape and size may mean that a difference is within a range of offset even if the same or a certain difference exists. Thus, if the cup part 233 has a rectangular shape, the forming space 111 may also have a rectangular shape. If the cup part 233 has a circular shape, the forming space 111 may also have a circular shape. When the pouch film 235 is seated on the top surface of the die 11, the pouch film 235 is seated while covering an opening end of the forming space 111 so that the forming space 111 is disposed in a region in which the cup part 233 will be formed later.

The partition wall 112 partitions the forming space 111 into first and second forming spaces 1111 and 1112. According to embodiments of the present invention, since the plurality of cup parts 233 have to be formed in the pouch film 235, the forming space 111 may be partitioned into a plurality of spaces by the partition wall 112. Here, the partition wall 312 may have a very thick thickness of 5 mm or more according to the related art. However, the partition wall 112 according to the present invention may have a thickness t2 of 0.1 mm to 3 mm, preferably, 1 mm to 2 mm. Also, since the two cup parts that are the pouches of the battery case 23 are bent to face each other, the non-sealing part 2342 (see FIG. 11) may have a width D2 that corresponds to approximately half of a distance between the two cup parts 233. Also, the thickness t2 of the partition wall 112 has a length corresponding to the distance between the two cup parts 233. Thus, since the partition wall 112 has the thickness t2 as described above, the non-sealing part 2342 may be manufactured to be reduced to a width D2 of 1.5 mm or less, particularly, 1 mm or less. That is, according to the related art, the non-sealing part 4342 has a width of minimum 2.5 mm According to the present invention, the non-sealing part 2342 may have a width D2 of 1.5 mm or less and an area of the non-sealing part 2342 is reduced by 40% or more to improve the energy efficiency.

The stripper 12 is disposed above the die 11 to fix the pouch film 235. As illustrated in FIG. 7, when the pouch film 235 is seated on the top surface of the die 11, the stripper 12 descends (S602). Also, the stripper 12 contacts the die 11 with the pouch film 235 therebetween and presses the pouch film 235 upward to fix the pouch film 235 (S603). Here, the contact of the stripper 12 and the die 11 with the pouch film 235 therebetween means that the components are not directly contact each other but indirectly contact each other through the pouch film 235. When the cup part 233 is formed later, the stripper 12 uniformly presses the pouch film 235 to uniformly disperse the elongation force applied to the pouch film 235. As a result, a bottom surface of the stripper 12 contacts the top surface of the pouch film 235 when the pouch film 235 is fixed. Thus, the stripper 12 may have a substantially flat bottom surface. However, the present invention is not limited thereto. For example, in order to more easily fix the pouch film 235, various shapes such as a lattice pattern or a fine unevenness may be formed on the bottom surface of the stripper 12.

As described above, in the pouch drawing method according to the related art, since the physical force is applied to the pouch film 435 by using the punch 33, the pouch film 435 may be ruptured at the portion thereof seated on the partition wall 312. To prevent the above problem from occurring, the stripper 32 has to contact the partition wall 312 as well as a peripheral portion of the forming space 111 with the pouch film 435 therebetween so as to fix the pouch film 435. However a top surface of the partition wall 312 has to be secured over a predetermined area so that the stripper 32 contacts the partition wall 312. Here, there has been a limit in reducing the thickness t1 of the partition wall 312 by at least 5 mm or more.

However, in the pouch forming method according to an embodiment of the present invention, since the electromagnetic force is applied without applying the physical force through the punch, the rupture of the pouch film 235 may not occur at the portion of the pouch film 235, which is seated on the partition wall 112. Thus, since the stripper 12 does not contact the partition wall 112 to fix the pouch film 235, the partition wall 112 may be very thin. That is, the stripper 12 according to an embodiment of the present invention may contact only the peripheral portion of the forming space 111 with the pouch film 235 therebetween without contacting the partition wall 112. Thus, it may be unnecessary to fix the pouch film 235. Also, since the stripper 12 does not contact the partition wall 112 to fix the pouch film 235, it is unnecessary that the partition wall 112 has a flat top surface. Thus, to more effectively prevent the pouch film 235 from being ruptured, the partition wall 112 may have a curved top surface that protrudes upward. Here, the curved surface may have a semicircular shape when viewed from a front side. In this case, it is preferable that the curved surface has a curved surface radius corresponding to half of the thickness t2 of the partition wall 112.

Figure 8:
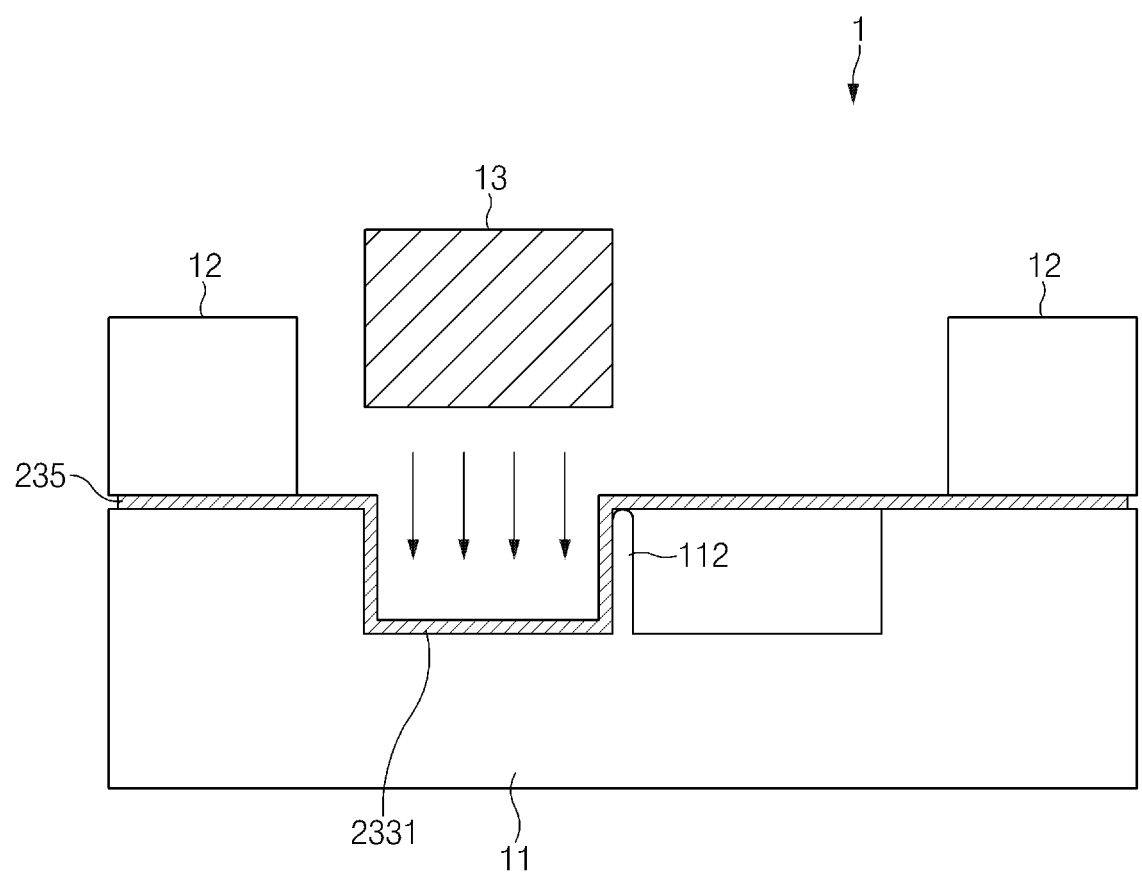
FIG. 8 is a schematic view illustrating a state in which an electromagnetic force generation part of the pouch forming apparatus forms a first cup part according to an embodiment of the present invention.

FIG. 8 is a schematic view illustrating a state in which the electromagnetic force generation part 13 of the pouch forming apparatus 1 forms the first cup part 2331 according to an embodiment of the present invention.

The electromagnetic force generation part 13 may be disposed above the forming space 111 to apply the electromagnetic force to the forming space 111 so that the pouch film 235 is stretched. Thus, the cup part 233 may be formed in the pouch film 235 to manufacture the pouch. A through-part is formed in an approximate center of a bottom surface of the stripper 12. Also, the electromagnetic force generation part 13 may be disposed to pass through the stripper 12 through the through-part. However, this is not limited thereto. For example, the electromagnetic force generation part 13 may be disposed on a bottom surface of a support part disposed inside the stripper 12 to support the stripper 12. That is, the electromagnetic force generation part 13 may be disposed at various position as long as the electromagnetic force generation part 13 is disposed above the forming space 111.

The electromagnetic force generation part 13 according to an embodiment of the present invention may be moved between an upper side of the first forming space 1111 and an upper side of the second forming space 1112. Thus, the electromagnetic force generation part 13 may be disposed above the first forming space 1111 to apply the electromagnetic force to the first forming space 1111 and then moved to the upper side of the second forming space 1112. Here, a moving part for moving the electromagnetic force generation part 13 and a control part for controlling the electromagnetic force generation part 13 may be further provided. The moving part may include a general motor and rail. As the motor is driven, the electromagnetic force generation part 13 may be moved along the rail. Thus, the rail may extend from the upper side of the first forming space 1111 up to the second forming space 1112.

The electromagnetic force generation part 13 receives current from the outside to generate the electromagnetic force. For this, the electromagnetic force generation part 13 includes at least one coil. Power is supplied from an external power supply device to a high-capacity capacitor, and a charging/discharging switch operates by a control circuit so that current that decays within a very short time of 100 µs to 900 µs is discharged to the coil through the capacitor. Thus, a variation in magnetic flux occurs in the coil, and induced electromotive force is generated in the pouch film 235 which is seated in the adjacent position. Particularly, since the pouch film 235 includes a gas barrier layer 2351 made of a metal, the induced electromotive force is generated in the gas barrier layer 2351 of the pouch film 235. The induced electromotive force is generated due to the variation in magnetic flux and derived as following Equation.

$$\varepsilon = -\frac{d\Phi}{dt} \quad \text{[Equation 1]}$$

This is referred to as Faraday's Law. In Equation 1, ε represents induced electromotive force, Φ represents a magnetic flux, and t represents a time.

Also, induced current flows in the pouch film 235 in a direction opposite to that, in which the current is supplied, due to the induced electromotive force. Force applied to a conductor, through which current flows, in magnetic fields is referred to as Lorentz's force. This force may become the electromagnetic force for forming the pouch film 235. That is, the induced current flows to the pouch film 235, and the pouch film 235 is formed by receiving the Lorentz's force. Lorentz's force is proportional to the magnitude of the induced current and is derived as following Equation.

$$F = Idl \times B \quad \text{[Equation 2]}$$

In Equation 2, I represents current flowing through the conductor, dl represents a length of the conductor, B is a magnetic flux density, and F is Lorentz's force. Also, Lorentz's force is generated in a direction perpendicular to a plane defined by the length dl of the conductor and the magnetic flux density B.

As illustrated in FIG. 8, the electromagnetic force generation part 13 is disposed first above the first forming space 1111 (S604) to generate the electromagnetic force and thereby to apply the electromagnetic force to the first forming space 1111 (S605). Then, the first cup part 2331 is drawn along the first forming space 1111 in the pouch film 235 by the electromagnetic force (S606).

Figure 9:
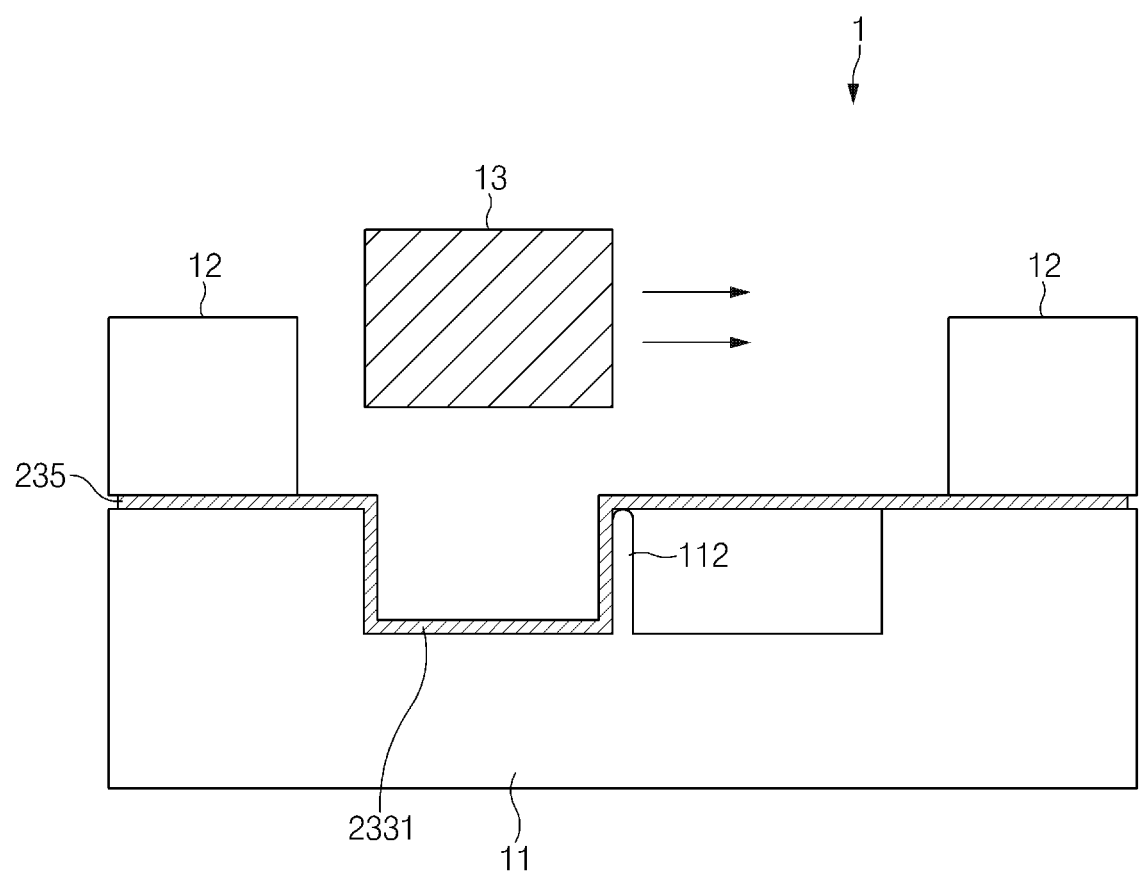
FIG. 9 is a schematic view illustrating a state in which the electromagnetic force generation part of the pouch forming apparatus is moved from an upper side of a first forming space to an upper side of a second forming space according to an embodiment of the present invention.

FIG. 9 is a schematic view illustrating a state in which the electromagnetic force generation part 13 of the pouch forming apparatus 1 is moved from the upper side of the first forming space 1111 to the upper side of the second forming space 1112 according to an embodiment of the present invention.

Figure 10:
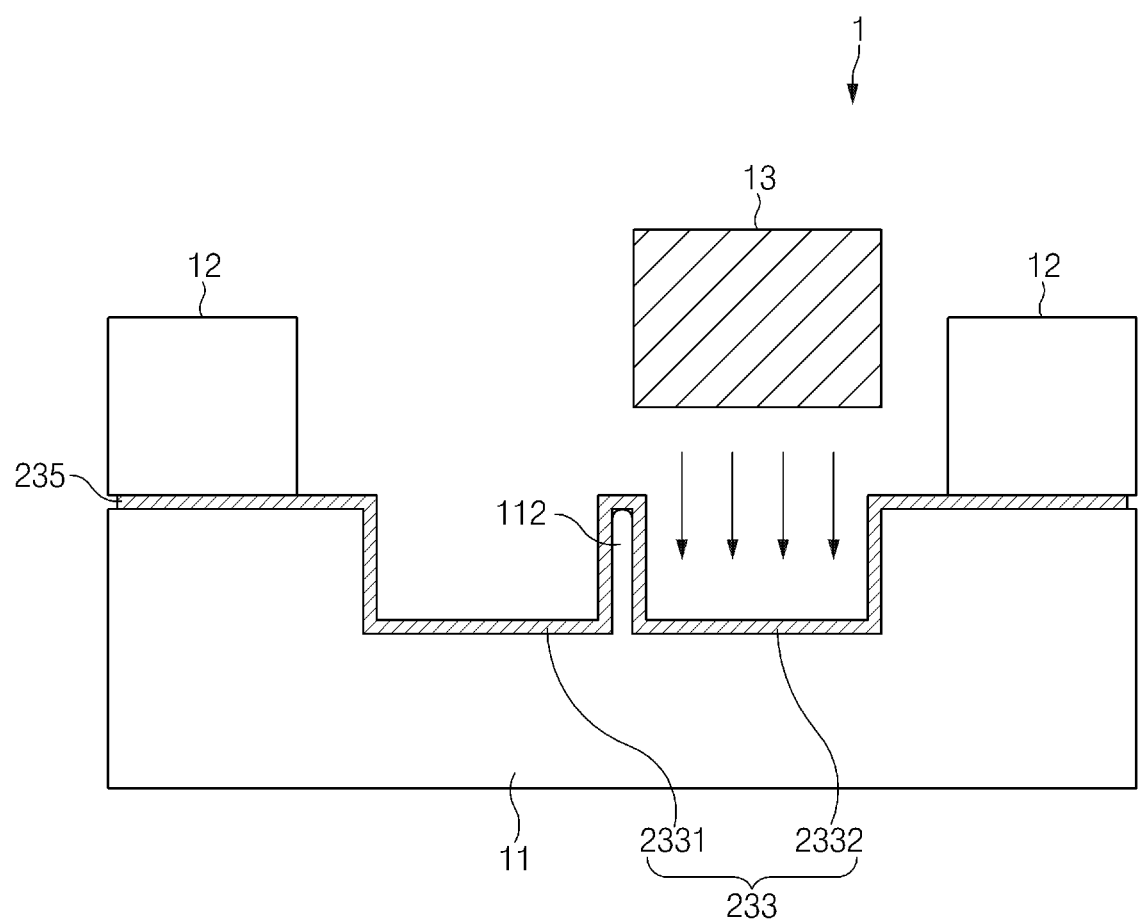
FIG. 10 is a schematic view illustrating a state in which the electromagnetic force generation part of the pouch forming apparatus forms a second cup part according to an embodiment of the present invention.

FIG. 10 is a schematic view illustrating a state in which the electromagnetic force generation part 13 of the pouch forming apparatus 1 forms the second cup part 2332 according to an embodiment of the present invention.

After the first cup part 2331 is formed in the pouch film 235, as illustrated in FIG. 9, the electromagnetic force generation part 13 is moved from the upper side of the first forming space 1111 to the upper side of the second forming space 1112 (S607). Then, as illustrated in FIG. 10, the electromagnetic force may be generated to be applied the second forming space 1112 (S608). Then, the second cup part 2332 is drawn along the second forming space 1112 in the pouch film 235 by the electromagnetic force (S609).

Figure 11:
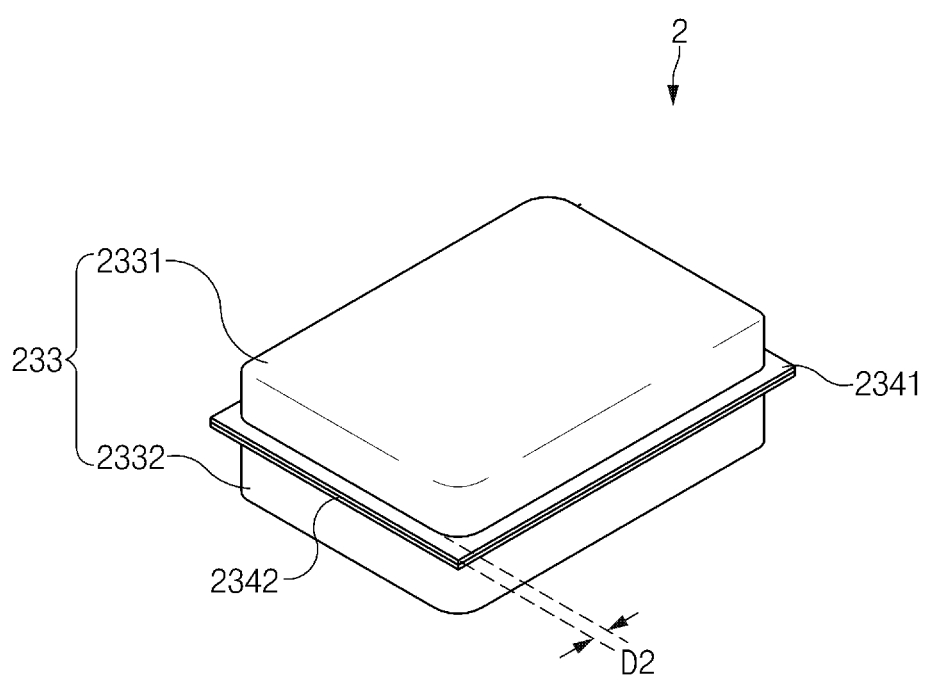
FIG. 11 is a perspective view of a secondary battery including a pouch formed by using the pouch forming apparatus according to an embodiment of the present invention.

FIG. 11 is a perspective view of a secondary battery 2 including the pouch formed by using the pouch forming apparatus 1 according to an embodiment of the present invention.

The pouch may be formed by using the pouch forming apparatus 1 according to an embodiment of the present invention through the above-described method to manufacture the secondary battery 2. Thus, as illustrated in FIG. 11, the non-sealing part 2342 of the secondary battery 2, which has a width D2 of 1.5 mm or less, particularly, 1 mm or less, may be manufactured to reduce an area of the non-sealing part 2342.

Figure 12:
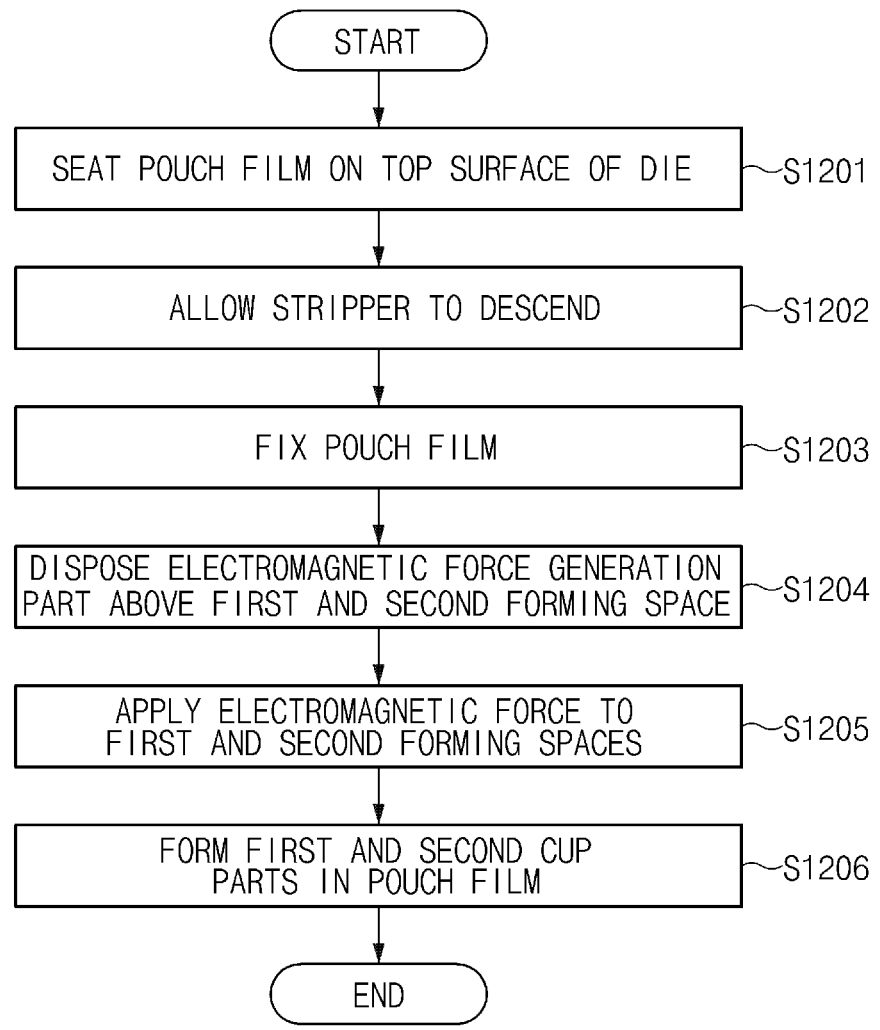
FIG. 12 is a flowchart illustrating a pouch forming method according to another embodiment of the present invention.

FIG. 12 is a flowchart illustrating a pouch forming method according to another embodiment of the present invention.

The electromagnetic force generation part 13 according to an embodiment of the present invention may be moved between the upper side of the first forming space 1111 and the upper side of the second forming space 1112. Thus, the electromagnetic force generation part 13 may be disposed above the first forming space 1111 to apply the electromagnetic force to the first forming space 1111 and then moved to the upper side of the second forming space 1112.

However, in a pouch forming apparatus 1a according to another embodiment of the present invention, an electromagnetic force generation part 13a is disposed above first and second forming spaces 1111 and 1112 at the same time. Also, the electromagnetic force generation part 13a may apply the electromagnetic force to the first and second forming spaces 1111 and 1112 at the same time. Hereinafter, another embodiment of the present invention will now be described with reference to the accompanying drawings, wherein like reference numerals refer to the like elements throughout. This is for convenience of description and is not intended to limit the scope of rights.

Hereinafter, each of the steps illustrated in the flowchart of FIG. 12 will be described with reference to FIGS. 13 to 14.

Figure 13:
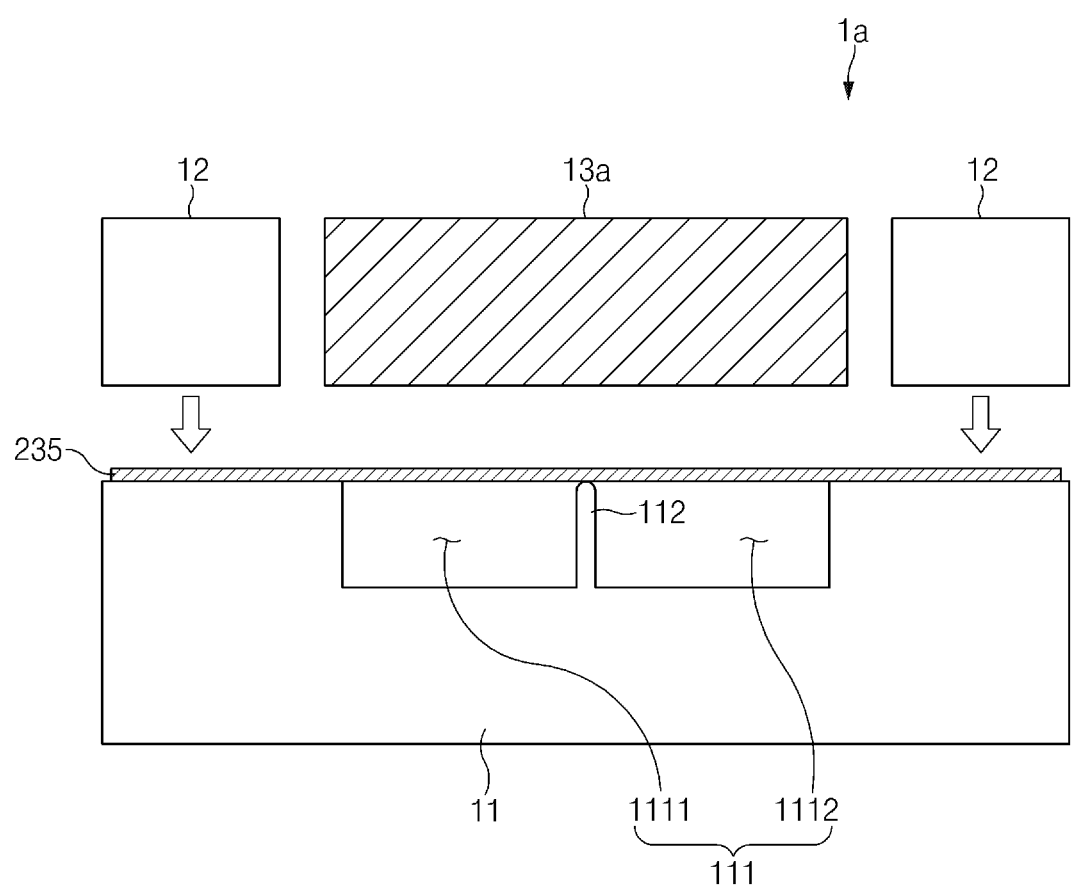
FIG. 13 is a schematic view illustrating a state in which a pouch film is seated on a top surface of a die of the pouch forming apparatus according to another embodiment of the present invention.

FIG. 13 is a schematic view illustrating a state in which a pouch film 235 is seated on a top surface of a die 11 of the pouch forming apparatus 1a according to another embodiment of the present invention.

The pouch forming apparatus 1a according to another embodiment of the present invention includes a die 111, a partition wall 112, a stripper 12, and an electromagnetic force generation part 13a. Also, the partition wall 112 has a thickness t2 of 0.1 mm to 3 mm, preferably, 1 mm to 2 mm.

In order to form a cup part 233 in a pouch film 235, first, as illustrated in FIG. 13, the pouch film 235 is seated on the top surface of the die 11 (S1201). Also, the stripper 12 descends (S1202) to contact the die 11 with the pouch film 235 therebetween and presses the pouch film 235 upward to fix the pouch film 235 (S1203).

Figure 14:
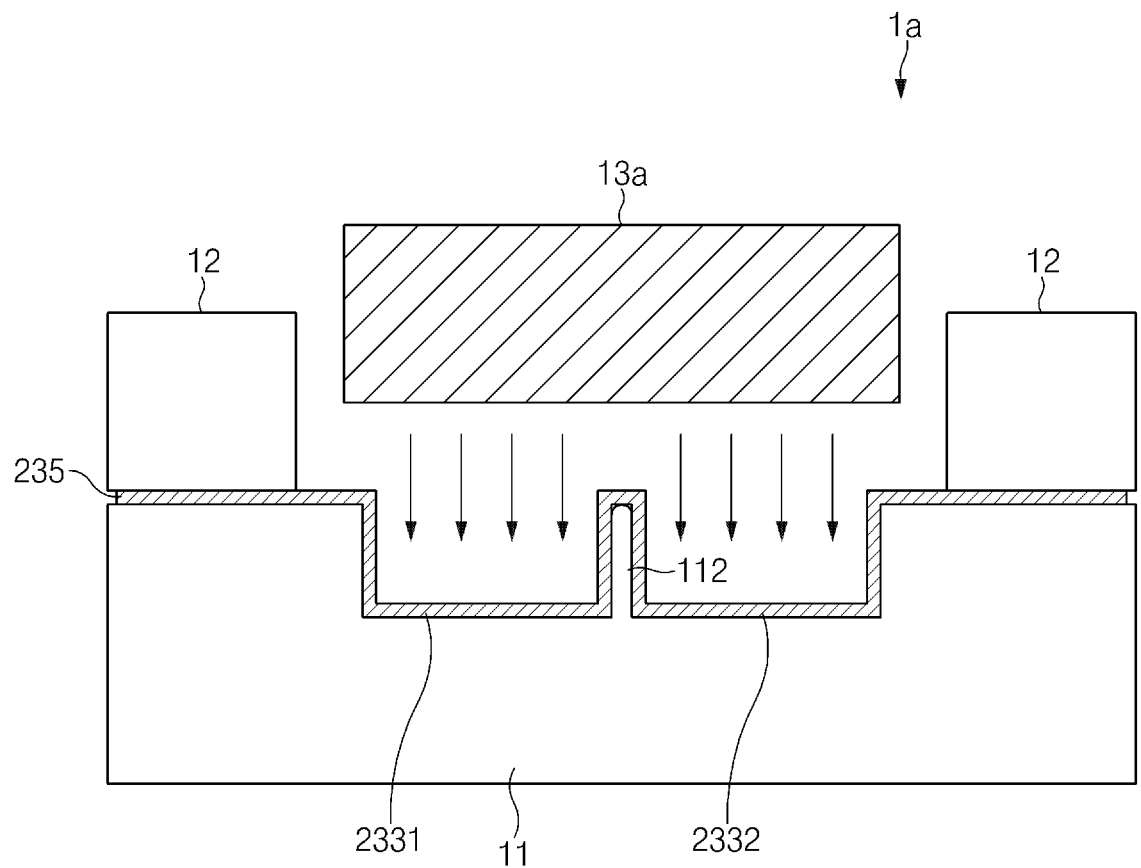
FIG. 14 is a schematic view illustrating a state in which an electromagnetic force generation part of the pouch forming apparatus forms first and second cup parts according to another embodiment of the present invention.

FIG. 14 is a schematic view illustrating a state in which the electromagnetic force generation part 13a of the pouch forming apparatus 1a forms first and second cup parts 2331 and 2332 according to another embodiment of the present invention.

The electromagnetic force generation part 13a according to another embodiment of the present invention is disposed above the first forming space 1111 as well as above the second forming space 1112 (S1204). Here, the electromagnetic force generation part 13a may be provided in plurality and thus be disposed above each of the first and second forming spaces 1111 and 1112. Alternatively, as illustrated in FIG. 14, one electromagnetic force generation part 13a may be provided in one body and thus be disposed above the first and second forming spaces 1111 and 1112 at the same time.

Also, the electromagnetic force generation part 13a applies the electromagnetic force to the first and second forming spaces 1111 and 1112 at the same time (S1205). Here, the applying of the electromagnetic force at the same time may include a case in which the electromagnetic force is applied to the first and second forming spaces 1111 and 1112 at the same time as well as a case in which the electromagnetic force is applied first to the first forming space 1111 and then applied to the second forming space 1112 at a predetermined time interval. Then, the first cup part 2331 and the second cup part 2332 are respectively drawn along the first forming space 1111 and the second forming space 1112 in the pouch film 235 by the electromagnetic force (S1206).

The pouch may be formed by using the pouch forming apparatus 1a according to another embodiment of the present invention through the above-described method to manufacture the secondary battery 2. Thus, as illustrated in FIG. 11, the non-sealing part 2342 of the secondary battery 2, which has a width D2 of 1.5 mm or less, particularly, 1 mm or less, may be manufactured to reduce an area of the non-sealing part 2342.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch forming apparatus comprising:
   a die in which a forming space is recessed inward from a top surface thereof;
   a partition wall partitioning the forming space into first and second forming spaces;
   a stripper disposed above the die and configured to descend to contact the die with the pouch film therebetween to fix the pouch film to be seated on a top surface of the die; and
   an electromagnetic force generation part disposed above the forming space and configured to generate an electromagnetic force and configured to apply the electromagnetic force to the forming space, the electromagnetic force generation part configured to apply the electromagnetic force to the first forming space and then move to a location above the second forming space.

2. The pouch forming apparatus of claim 1, wherein the electromagnetic force generation part is configured to be disposed above the first forming space.

3. The pouch forming apparatus of claim 2, wherein the electromagnetic force generation part is configured to be disposed above the second forming space.

4. The pouch forming apparatus of claim 1, wherein the partition wall has a thickness of 0.1 mm to 3 mm.

5. The pouch forming apparatus of claim 4, wherein the partition wall has a thickness of 1 mm to 2 mm.

6. The pouch forming apparatus of claim 1, wherein the stripper is configured to contact only a peripheral portion of the die located outside of a periphery of the forming space with the pouch film therebetween to fix the pouch film to be seated on the top surface of the die.

7. The pouch forming apparatus of claim 1, wherein an upwardly-protruding end of the partition wall has a curved surface.

8. A pouch forming method comprising:
   seating a pouch film on a top surface of a die to cover an open end of a forming space that is recessed inward from the top surface of the die and that is partitioned into first and second forming spaces by a partition wall;
   descending a stripper from an upper location above and remote from the die to a lower location adjacent to the top surface of the die;
   contacting the stripper to the pouch film to seat the pouch film onto the top surface of the die; and
   generating an electromagnetic force with an electromagnetic force generation part disposed above the forming space so as to apply the electromagnetic force to the forming space, so that a first cup part and a second cup part are respectively drawn in the pouch film along the first forming space and the second forming space, respectively,
   wherein the generating of the electromagnetic force comprises the electromagnetic force generation part applying the electromagnetic force to the first forming space, drawing the first cup part in the pouch film, moving the electromagnetic force generation part to a location above the second forming space, the electromagnetic force generation part applying the electromagnetic force to the second forming space, and drawing the second cup part in the pouch film.

9. The pouch forming method of claim 8, wherein, during the generating of the electromagnetic force, the electromagnetic force generation part is disposed above the first forming space.

10. The pouch forming method of claim 9, wherein, during the generating of the electromagnetic force, the electromagnetic force generation part is disposed above the second forming space.

11. The pouch forming method of claim 8, wherein the partition wall has a thickness of 0.1 mm to 3 mm.

12. The pouch forming method of claim 11, wherein the partition wall has a thickness of 1 mm to 2 mm.

13. The pouch forming method of claim 8, wherein, during the contacting of the stripper to the pouch film, the stripper contacts only a peripheral portion of the die located outside of a periphery of the forming space with the pouch film therebetween to fix the pouch film to be seated on the top surface of the die.

* * * * *